United States Patent [19]
Tura

[11] 3,788,345
[45] Jan. 29, 1974

[54] DEVICES FOR PIERCING TUBES IN CLOSED PRESSURE SYSTEMS AND FOR CHARGING THE LATTER

[76] Inventor: Natale G. Tura, 343 Griswold St., N. E., Warren, Ohio 44483

[22] Filed: Aug. 4, 1971

[21] Appl. No.: 168,958

[52] U.S. Cl. ............................................. 137/318
[51] Int. Cl. ...................... B23b 41/08, F1be 41/04
[58] Field of Search .... 137/315, 317, 318; 285/197, 285/198, 199

[56] References Cited
UNITED STATES PATENTS

| 210,706 | 12/1878 | Penney | 137/318 |
|---|---|---|---|
| 2,332,350 | 10/1943 | Scritchfield | 285/197 X |
| 3,052,286 | 9/1962 | Kramer et al. | 285/197 X |
| 3,162,211 | 12/1964 | Barusch | 137/318 |
| 3,252,475 | 5/1966 | Jones | 137/318 |
| 3,336,937 | 8/1967 | Ehrens et al. | 137/318 |
| 3,480,036 | 11/1969 | Ehrens et al. | 137/318 |
| 3,648,725 | 3/1972 | Strybel | 137/318 |
| 3,661,169 | 5/1972 | Mullins | 137/318 |

Primary Examiner—Martin P. Schwadron
Assistant Examiner—David R. Matthews
Attorney, Agent, or Firm—Michael Williams

[57] ABSTRACT

A device which may not only be used to pierce a tube in a closed pressure system for the purpose of checking or recharging the pressure therein, but which may be left on the tube to seal the pierced hole and may be reused in the future for again checking the pressure or recharging the system.

The device comprises a two part body, one part having ribs and the other having ledges to receive the ribs. The parts are held assembled with the tube by a simple set screw threaded through one part and engageable with the tube to draw the parts into interlocking relation. An injection needle is threaded through the other part to pierce the tube, such other part carrying a seal to prevent loss of pressure through the pierced opening. The piercing needle incorporates a valve, like a tire valve, so that the system may be checked or charged. A cap is threaded on the piercing needle and is used to thread the latter for piercing the tube.

5 Claims, 4 Drawing Figures

PATENTED JAN 29 1974 3,788,345
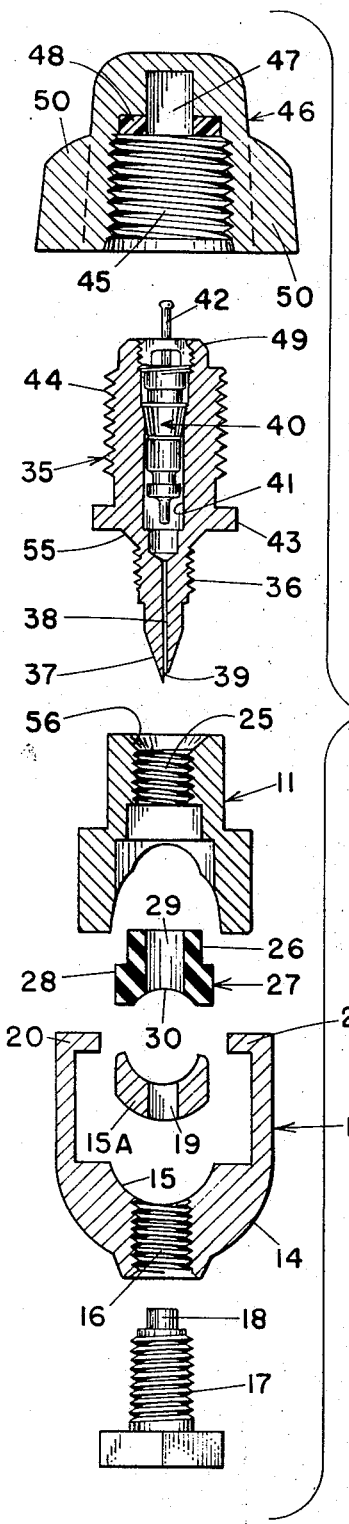
FIG.3.
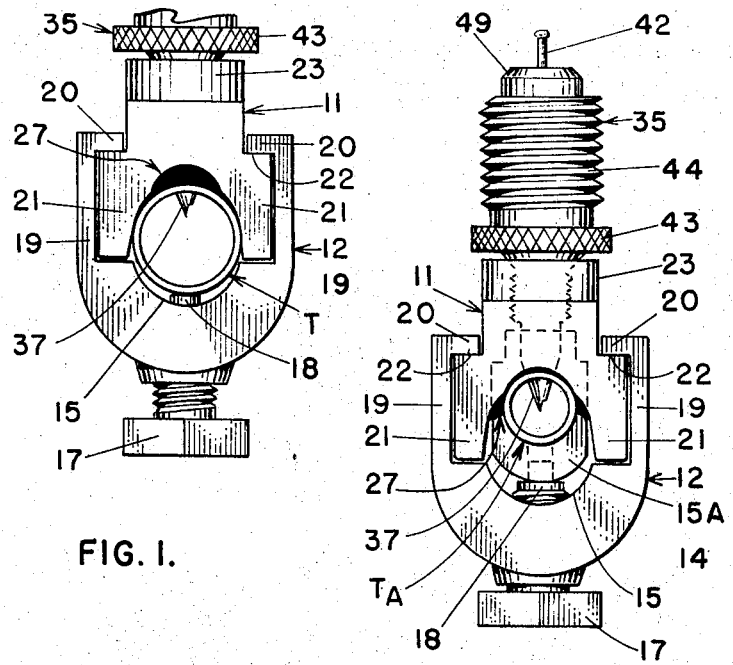
FIG.1.
FIG.2.
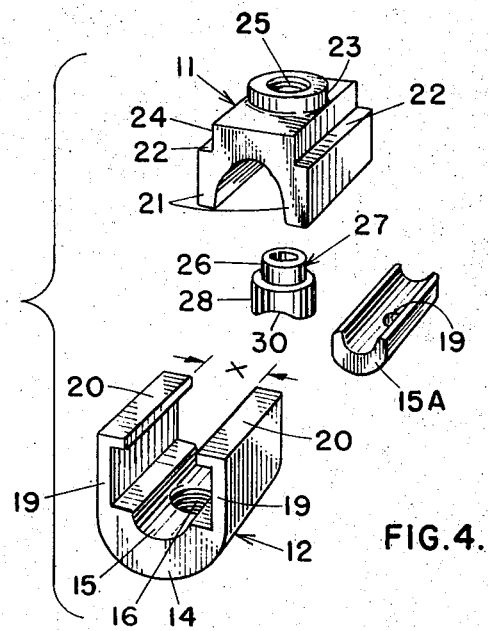
FIG.4.
INVENTOR.
NATALE G. TURA
BY
Michael Williams
ATTORNEY

DEVICES FOR PIERCING TUBES IN CLOSED PRESSURE SYSTEMS AND FOR CHARGING THE LATTER

BACKGROUND AND SUMMARY

There are many piercing valves in the prior art for use in servicing closed pressure system, such as refrigeration or air conditioning systems. However, many of such valves are fit for a single use only, whereas others are bulky and cannot be used in closely confined places, and yet others require special tools for their assembly or use, or require ordinary tools, like screw drivers, which cannot be used in confined places.

The device of my invention is extremely small, and is of only insignificant size larger than the tube on which it is to be installed. The body of my improved device is formed of two parts so that it may be easily assembled around a tube at practically any place, the parts interengaging with each other to form the body without the requirement of any tool, and the body being locked on the tube by a simple set screw requiring little more than finger pressure.

A piercing needle is threaded through the body to pierce the tube, an end cap being provided to rotate the piercing needle, and a seal is carried by the body to automatically seal around the pierced opening. The piercing needle embodies a valve which permits testing, charging or exhaustion of the system. Once the device is installed on the tube, it may remain there, without danger of leakage, and is always ready for subsequent checking or charging of pressure in the system.

DESCRIPTION OF THE DRAWING

In the drawing accompanying this description and forming a part of this specification, there is shown, for purpose of illustration, an embodiment which my invention may assume, and in this drawing:

FIG. 1 is an enlarged, side elevation of a device embodying my invention, showing the device assembled on a tube of a certain diameter, FIG. 2 is a view similar to FIG. 1 but showing the device adapted for use with a tube of a smaller diameter, FIG. 3 shows the parts comprising my invention in disassembled manner and in section, and FIG. 4 is a disassembled perspective view of certain parts.

DESCRIPTION OF THE PREFERRED EMBODIMENT

In the embodiment herein disclosed, a body 10 is adapted to be disposed around a tube of a refrigeration or air conditioning system. Such systems have a compressor with the usual suction and discharge lines. In most cases the compressor also has a service or charging tube for the convenience of a serviceman, and sometimes this tube is quite short and inaccessible, but since my improved piercing and charging device is very small, it may be installed in very close quarters.

The body 10 is made in two parts 11 and 12, which provides for easy installation on the tube. Body part 12 comprises a base portion 14 having an arcuate groove 15 in which a peripheral portion of a tube T (FIG. 1) may be cradled. My improved device is adapted to fit tubing of various sizes, and for tubing of a smaller diameter than the tube T, such as tube $T_a$ shown in FIG. 2, an adapter 15A may be used. The adapter 15A is a small segment, crescent shape in cross-section, having a lower arcuate surface adapted to be cradled in the groove 15 of the base portion, and having an upper arcuate surface for cradling a peripheral portion of the tube $T_a$.

The base portion 14 of the body part 12 has a threaded opening 16 for receiving the threaded shank of a set screw 17, the head of the screw being square or polygonal to receive a wrench, if necessary. The screw shank has a reduced end 18 to pass through an opening 19 in the adapter 15A when the latter is used. Otherwise, this reduced end bears directly against the tube T as seen in FIG. 1. The body part 12 has spaced side walls 19—19 which terminate in inwardly directed ribs 20—20.

The body part 11 has spaced walls 21—21 terminating in ledges 22—22. Extending upwardly from the ledges 22—22 is a head 23 having flat side surfaces 24 spaced a distance slightly less than the distance "X" between the ribs 20—20. The distance between the exterior of the walls 21—21 of body part 11 is slightly less than the distance between the interior of the walls 19—19 of body part 12. Therefore, both body parts may be applied to the periphery of the tube in misaligned manner at closely spaced longitudinal portions of the tube, and then slid along the tube and toward each other to aligned manner so that the walls 21—21 nest within the walls 19—19 and the head 23 is disposed between the ribs 20—20. The set screw 17 may then be tightened on the tube to draw the parts 11–12 together and thus hold them assembled. If the adapter 15A is used, it is assembled with the body part 12.

The head 23 has a threaded opening 25 leading to an interior portion of the body part 11. This interior portion is provided with stepped circular openings, the smaller of which closely receives the reduced end 26 of a sealing member 27, and the larger opening receives the larger end 28 of the sealing member. An opening 29 extends completely through the sealing member and an arcuate groove 30 is formed in the undersurface of the end 28 to fit a peripheral portion of the tube. The sealing member may be formed of neoprene, or other suitable resilient material, and its end 26 may have a force fit with the smaller stepped opening in the body part 11, or it may be cemented in place. As the body parts 11–12 are drawn together by the set screw 17, the sealing member 27 is compressed against the adjoining wall portion of the tube to seal around the area through which a small hole is to be pierced.

A piercing needle 35 has exterior screw threads 36 matching the threads in the opening 25 so that the inner portion of the needle may be threaded through such opening. The piercing needle has a piercing point 37 at its lower end, a small bore 38 establishing communication between the interior of the piercing needle and an opening 39 at the side of the piercing point 37. A valve member 40, such for example as used in an automobile tire, is threaded into the larger bore 41 of the piercing needle and has the usual operating plunger 42 extending upwardly from the needle.

A circular flange 43 is formed intermediate the ends of the piercing needle, and the latter has external screw threads 44 adapted to engage with interior threads 45 on a cap 46. The cap has an interior recess 47 to clear the operating plunger 42 of the valve member 40, and a plastic sealing ring 48 adapted to engage the upper bevelled end 49 of the valve body. Wings 50 are formed on the cap for finger manipulation.

In use, the valve body parts 11 and 12 are positioned in misaligned relation on the tube T and then slid toward each other so that the ribs 20—20 of the part 12 overlie the ledges 22—22. The set screw 17 is then threaded inwardly of the body part 12 so that its inner end engages against the tube wall and thereby draws the ribs 20—20 tightly onto the ledges 22—22 to firmly hold the body onto the tube. It will be appreciated that the adapter 15A will have been assembled with the body part 12 if the smaller tube $T_a$ is to be operated on.

The piercing needle 35 may be carried by the body part 11 in retracted relation during assembly, or this needle may be assembled with the body part 11 after the body 10 is assembled on the tube. Normally, the cap 46 is assembled with the piercing needle 35 and is used to turn the latter inwardly of the body part 11 so that the piercing point 37 pierces the adjoining wall of the tube sufficiently to dispose the opening 39 within the tube. Since the opening 39 is at a side of the piercing point, it will not be closed by any tube wall displacement during the piercing operation.

The tubes in a refrigeration or air conditioning system are usually formed of copper, or similar soft metal, and finger pressure on the wings of the cap 46 is usually sufficient to cause the point 37 to pierce the tube wall. To limit the amount of inward movement of the piercing point 37, the valve body has a conical surface 55 (FIG. 3) with engages a complementarily shaped surface 56 on the body part 11. In turning the piercing needle 35 through use of the cap 46, the plastic ring is seated on the valve body surface 49 so that the screw threads 44-45 are not jammed during the piercing operation. Therefore, after the tube has been pierced, the cap may be unthreaded from the piercing needle 35 without affecting rotation of the latter. It will be appreciated that the piercing needle is held against rotation during the unthreading of the cap 46 by reason of the friction fit between the piercing point 37 and the wall defining the pierced opening in the tube and/or by the friction fit between the surfaces 55 and 56 of the needle and head 23.

With the cap 46 removed, a serviceman may thread a coupling (not shown) to the threads 44 of the valve body, the coupling being connected by a hose to a charging tank, with a pressure gauge in communication with the hose. The coupling has means to engage and push the valve operating plunger 42 inwardly of the piercing needle 35 to unseat the valve member 40, and such means are conventional and may be similar to those found in couplings at the end of an air hose used in inflating a tire. Thus, the serviceman may not only check the system for pressure, but he may also exhaust all pressure, or recharge the system. After the system has been recharged, the serviceman threads the cap 46 onto the piercing needle and the entire device remains on the tube for subsequent use.

I claim:

1. A device for piercing a hole in the wall of a metal, fluid-carrying tube forming a part of a pressure system, comprising:

a two-part body, each part being adapted to encircle a portion of the peripheral wall of said tube, one of said body parts having spaced ribs facing each other and the other body part having ledges over which respective ribs engage, said body parts being initially disposed around said tube and displaced from each other in a direction longitudinally of the tube and thereafter moved toward each other along said tube to loosely interengage said ribs and ledges and thus provide a loose assembly of said body parts so that said device may be freely moved as a unit along said tube.

means carried by one of said body parts and manipulated after said loose assembly of said body parts is effected to firmly interengage said ribs and ledges and thereby fix said device against movement along said tube, and a piercing needle carried by one of said body parts and movable relative thereto in a direction toward the interior of said tube to pierce the wall of the latter.

2. The construction according to claim 1 wherein a set screw is threaded through the body part having the ribs, said set screw being rotatable in a direction to force its inner end into engagement with the outer wall of said tube and thus draw the rib-carrying body part away from said tube wall and thereby firmly engage said ribs over said ledges.

3. The construction according to claim 2 and including an adapter member fitting between the wall of said tube and the rib-carrying body part, said adapter member having an opening through which the inner end of said set screw passes for engagement with the tube wall.

4. A device for piercing a hole in the wall of a metal, fluid-carrying tube forming a part of a pressure system, comprising:

a two part body, each part being adapted to encircle a portion of the peripheral wall of said tube, said parts being initially disposed around said tube and displaced from each other in a direction longitudinally of the tube and thereafter moved toward each other along said tube to loosely interengage a portion of one with a portion of the other, the interengaged portions at this time providing a loose assembly of said parts so that said device may be freely moved as a unit along said tube, means carried by one of said body parts and manipulated after said loose assembly of parts is effected to firmly interengage said portions and fix said device against movement along said tube, the other of said body parts having an opening whose axis is substantially normal to the longitudinal axis of said tube, an aperture sealing gasket seated within said opening and having an end facing said tube wall, in loose assembly of said body parts said gasket end being out of tight sealing engagement with said tube wall, and in fixed position of said device said gasket end being firmly pressed against said tube wall, and a piercing needle threaded into said other body part opening and rotatable when said device is fixed on said tube so that its piercing end extends through said gasket aperture and said body wall, said gasket sealing around the hole pierced in the tube wall.

5. A device for piercing a hole in the wall of a metal, fluid-carrying tube forming a part of a pressure system, comprising:

a two part body, each part being adapted to encircle a portion of the peripheral wall of said tube, said parts being initially disposed around said tube and displaced from each other in a direction longitudinally of the tube and thereafter moved toward each other along said tube to loosely interengage a portion of one with a portion of the other, the interengaged portions at this time providing a loose assembly of said parts so that said device may be freely moved as a unit along said tube, means carried by one of said body parts and manipulated after said loose assembly of parts is effected to firmly interengage said portions and fix said device against movement along said tube, and a piercing needle carried by one of said body parts and movable relative thereto in a direction toward the interior of said tube to pierce the wall of the latter, said piercing needle having a longitudinal opening therethrough, one end of such opening being in communication with the interior of said tube when the latter is pierced, and a spring-pressed valve of the Schroeder type in the other end of said piercing needle opening to control flow of fluid therethrough.

* * * * *